United States Patent
Iizuka et al.

(10) Patent No.: US 10,369,419 B2
(45) Date of Patent: *Aug. 6, 2019

(54) GOLF BALL

(71) Applicant: Bridgestone Sports Co., Ltd., Minato-ku, Tokyo (JP)

(72) Inventors: Kae Ilzuka, Saitamaken (JP); Tsuyoshi Nakajima, Saitamaken (JP); Yuichiro Ozawa, Saitamaken (JP)

(73) Assignee: Bridgestone Sports Co., Ltd., Minato-ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/624,842

(22) Filed: Jun. 16, 2017

(65) Prior Publication Data
US 2017/0282017 A1 Oct. 5, 2017

Related U.S. Application Data

(63) Continuation of application No. 14/984,755, filed on Dec. 30, 2015, now Pat. No. 9,724,568, which is a continuation-in-part of application No. 14/934,445, filed on Nov. 6, 2015, now Pat. No. 9,764,196, which is a continuation of application No. 14/016,801, filed on Sep. 3, 2013, now Pat. No. 9,211,445.

(51) Int. Cl.
A63B 37/04 (2006.01)
A63B 37/00 (2006.01)
C08L 21/00 (2006.01)

(52) U.S. Cl.
CPC ........ *A63B 37/0074* (2013.01); *A63B 37/006* (2013.01); *A63B 37/0024* (2013.01); *A63B 37/0051* (2013.01); *A63B 37/0063* (2013.01); *A63B 37/0064* (2013.01); *A63B 37/0065* (2013.01); *A63B 37/0066* (2013.01); *A63B 37/0068* (2013.01); *A63B 37/0075* (2013.01); *A63B 37/0076* (2013.01); *C08L 21/00* (2013.01)

(58) Field of Classification Search
USPC ................................. 473/351–378
See application file for complete search history.

(56) References Cited

U.S. PATENT DOCUMENTS

| | | | | |
|---|---|---|---|---|
| 4,570,937 A * | 2/1986 | Yamada | A63B 37/0003 | 473/372 |
| 4,650,193 A * | 3/1987 | Molitor | A63B 37/0003 | 264/265 |
| 4,726,590 A * | 2/1988 | Molitor | A63B 37/02 | 473/372 |
| 5,033,748 A * | 7/1991 | Ebisuno | A63B 37/0003 | 473/371 |
| 5,184,828 A * | 2/1993 | Kim | A63B 37/0003 | 473/373 |
| 5,403,010 A * | 4/1995 | Yabuki | A63B 37/0003 | 473/372 |
| 5,543,467 A * | 8/1996 | Hamada | C08L 23/0869 | 473/385 |
| 5,731,371 A * | 3/1998 | Nesbitt | C08F 279/02 | 473/371 |
| 5,733,977 A * | 3/1998 | Takemura | A63B 37/0003 | 473/372 |
| 5,776,012 A * | 7/1998 | Moriyama | A63B 37/0003 | 473/372 |
| 5,816,938 A | 10/1998 | Kakiuchi | | |
| 5,816,939 A * | 10/1998 | Hamada | A63B 37/0003 | 473/357 |
| 5,816,944 A * | 10/1998 | Asakura | A63B 37/0003 | 473/372 |
| 5,833,552 A * | 11/1998 | Hamada | C08L 23/0876 | 473/359 |
| 5,929,171 A * | 7/1999 | Sano | A63B 37/0003 | 473/372 |
| 6,220,972 B1 * | 4/2001 | Sullivan | A63B 37/0003 | 473/373 |
| 6,602,941 B2 * | 8/2003 | Higuchi | A63B 37/0003 | 473/357 |
| 6,786,836 B2 * | 9/2004 | Higuchi | A63B 37/0003 | 473/351 |
| 6,786,840 B2 * | 9/2004 | Hayashi | A63B 37/0003 | 473/377 |
| 6,835,779 B2 * | 12/2004 | Voorheis | A63B 37/0003 | 473/377 |
| 6,919,393 B2 * | 7/2005 | Mano | A63B 37/0003 | 473/371 |
| 7,083,532 B2 * | 8/2006 | Ohama | A63B 37/0003 | 473/371 |
| 7,358,308 B2 * | 4/2008 | Bulpett | A63B 37/0003 | 473/371 |
| 7,387,581 B2 * | 6/2008 | Higuchi | A63B 37/0031 | 473/378 |

(Continued)

FOREIGN PATENT DOCUMENTS

JP 59074135 A * 4/1984
JP 8294548 A 11/1996

(Continued)

*Primary Examiner* — Alvin A Hunter
(74) *Attorney, Agent, or Firm* — Sughrue Mion, PLLC

(57) ABSTRACT

The invention provides a golf ball having a core and a cover of one layer or a plurality of layers, wherein the core is formed of a material molded under heat from a rubber composition containing (A) a base rubber, (B) an organic peroxide, and (C) water and/or a metal monocarboxylate, and has a hysteresis loss of 50% or less when compressed at a load cell speed of 500 mm/min and under a constant load of 5,000 N.

20 Claims, No Drawings

(56) References Cited

U.S. PATENT DOCUMENTS

| | | | |
|---|---|---|---|
| 7,455,602 B2 * | 11/2008 | Sato | A63B 37/0004 473/383 |
| 7,481,722 B2 * | 1/2009 | Higuchi | A63B 37/0003 473/377 |
| 7,695,379 B2 * | 4/2010 | Higuchi | A63B 37/0003 473/377 |
| 7,727,085 B2 * | 6/2010 | Higuchi | A63B 37/0033 473/377 |
| 7,897,694 B2 * | 3/2011 | Rajagopalan | A63B 37/0003 473/371 |
| 8,021,249 B2 * | 9/2011 | Higuchi | A63B 37/0004 473/384 |
| 8,313,395 B2 * | 11/2012 | Sullivan | A63B 37/0062 473/373 |
| 8,367,779 B1 * | 2/2013 | Ozawa | C08K 5/098 525/331.9 |
| 8,469,835 B2 | 6/2013 | Asakura et al. | |
| 8,648,133 B2 * | 2/2014 | Ozawa | C08K 5/405 473/372 |
| 8,657,704 B2 * | 2/2014 | Ohama | A63B 37/0003 473/371 |
| 8,734,273 B2 * | 5/2014 | Tachibana | A63B 37/0003 473/371 |
| 8,802,788 B2 * | 8/2014 | Nakajima | C08K 5/175 473/351 |
| 8,882,610 B2 * | 11/2014 | Matsuyama | A63B 37/0031 473/376 |
| 8,998,749 B2 * | 4/2015 | Tarao | A63B 37/0003 473/373 |
| 9,199,130 B2 * | 12/2015 | Fushihara | A63B 37/0063 |
| 9,211,445 B2 * | 12/2015 | Nakajima | A63B 37/006 |
| 9,662,543 B2 * | 5/2017 | Tago | A63B 45/00 |
| 9,675,845 B2 * | 6/2017 | Nakajima | C08K 5/00 |
| 9,724,568 B2 * | 8/2017 | Yamazaki | A63B 37/0074 |
| 9,855,466 B2 * | 1/2018 | Watanabe | A63B 37/0051 |
| 10,046,206 B2 * | 8/2018 | Ohira | C08L 21/00 |
| 2002/0052252 A1 | 5/2002 | Maruoka | |
| 2003/0038399 A1 * | 2/2003 | Scolamiero | B29C 35/0222 264/236 |
| 2003/0100383 A1 * | 5/2003 | Jordan | A63B 37/0003 473/371 |
| 2004/0214661 A1 * | 10/2004 | Sullivan | A63B 37/0003 473/371 |
| 2005/0004325 A1 * | 1/2005 | Wu | A63B 37/00 525/462 |
| 2005/0113200 A1 * | 5/2005 | Okuno | F16G 1/28 474/266 |
| 2005/0154132 A1 * | 7/2005 | Hakuta | C08K 5/0025 525/105 |
| 2006/0073913 A1 * | 4/2006 | Castner | A63B 37/0003 473/371 |

FOREIGN PATENT DOCUMENTS

| | | |
|---|---|---|
| JP | 1085367 A | 4/1998 |
| JP | 2002102388 A | 4/2002 |
| JP | 2003126300 A | 5/2003 |
| JP | 3413800 B2 | 6/2003 |
| JP | 4637762 B2 | 2/2011 |

* cited by examiner

GOLF BALL

CROSS-REFERENCE TO RELATED APPLICATION

This application is a continuation application of copending application Ser. No. 14/984,755 filed Dec. 30, 2015, which is a continuation-in-part of copending application Ser. No. 14/934,445 filed on Nov. 6, 2015, which is a continuation of application Ser. No. 14/016,801 filed on Sep. 3, 2013, now U.S. Pat. No. 9,211,445 allowed Sep. 15, 2015, the entire contents of each of which are hereby incorporated by reference.

BACKGROUND OF THE INVENTION

The present invention relates to a golf ball having a core and a cover of one layer or a plurality of layers. More particularly, the invention relates to a golf ball that contains water in the core composition and has a high rebound.

Various approaches are being taken to improve the flight performance and spin performance of golf balls. Golf balls generally have a construction that includes a core (solid center) encased by a cover of one layer or a plurality of layers. In recent years, the number of layers in this construction has increased. The core accounts for the majority of the ball in terms of volume, and so is thought to play a large role in determining the ball performance. Given that cores today are made of rubber compositions, numerous compounding studies are being done to improve the resilience of the core itself.

However, experimental data showing a relationship between differences in the rubber formulation and increased resilience are almost unknown, and much remains unclear about the mechanisms involved and the degree to which they contribute to resilience.

Several golf balls in which the ball properties were improved by focusing on hysteresis loss by the ball materials have been described in the art. For example, U.S. Pat. No. 8,469,835 (and the corresponding JP No. 4637762) discloses a golf ball having a thermoplastic polyurethane cover with a specific hysteresis loss. JP No. 3413800 discloses a golf ball composed of a center, a layer of rubber thread wound over the center, and a cover layer, with the rubber thread having a hysteresis loss under 0 to 100% extension at or below a given range. JP-A H08-294548 discloses a wound golf ball composed of a liquid center and a rubber thread layer, wherein the liquid center, when deformed to 50% of the center diameter, has a hysteresis loss at or below a given range.

Yet, the foregoing golf balls do not concern solid core materials. Also, additional improvements have been made recently to conventional core materials and core properties, and are expected to lead to still further increases in the rebound of golf balls.

SUMMARY OF THE INVENTION

It is therefore an object of the invention to provide a golf ball in which, by further improving the materials and properties of the golf ball core, the ball rebound and spin rate-lowering performance can be even further improved.

As a result of extensive investigations, the inventors have discovered that, by forming a golf ball core of a material molded under heat from a rubber composition which includes (A) a base rubber, (B) an organic peroxide and (C) water and/or a metal monocarboxylate, and by having the hysteresis loss of the core when compressed at a load cell speed of 500 mm/min and under a constant load of 5,000 N be 50% or less, the ball can be endowed with a high rebound and a good spin rate-lowering performance.

More specifically, in the inventive golf ball having a core and a cover of one layer or a plurality of layers, decomposition of the organic peroxide within the core formulation can be promoted by the direct addition of water (or a water-containing material) to the core material. It is known that the decomposition efficiency of the organic peroxide within the core-forming rubber composition changes with temperature, and that, starting at a given temperature, the decomposition efficiency rises with increasing temperature. If the temperature is too high, the amount of decomposed radicals rises excessively, leading to recombination between radicals and, ultimately, deactivation. As a result, fewer radicals act effectively in crosslinking. Here, when a heat of decomposition is generated by decomposition of the organic peroxide at the time of core vulcanization, the vicinity of the core surface remains at substantially the same temperature as the temperature of the vulcanization mold, but the temperature near the core center, due to the build-up of heat of decomposition by the organic peroxide which has decomposed from the outside, becomes considerably higher than the mold temperature. In cases where water (or a water-containing material) is added directly to the core, because the water acts to promote decomposition of the organic peroxide, radical reactions like that described above can be made to differ at the core center and at the core surface. That is, decomposition of the organic peroxide is further promoted near the center of the core, bringing about greater radical deactivation, which leads to a further decrease in the amount of active radicals. As a result, it is possible to obtain a core in which the crosslink densities at the core center and at the core surface differ markedly. It is also possible to obtain a core having different dynamic viscoelastic properties at the core center.

Also, the core is modified so as to have a hysteresis loss of 50% or less when compressed at a load cell speed of 500 mm/min and under a constant load of 5,000 N. The mechanism involved, although not entirely clear, is thought to be as follows. When a manufactured ball, after being struck, recovers its shape during flight, that portion of the mechanical energy imparted to the ball upon impact which is converted to thermal energy decreases, enabling the mechanical energy that should be fully transferred to the ball to be increased and allowing this energy, as a result, to contribute to increased rebound and a greater spin rate-lowering effect. Moreover, the inventive golf ball having such a core undergoes little decrease in rebound over time, has a good feel at impact, and also has an excellent durability.

When zinc monoacrylate is used instead of the above water, water is generated from the zinc monoacrylate by heat during kneading of the compounding materials. An effect similar to that obtained by the addition of water can thereby be obtained.

Accordingly, the invention provides the following golf ball.

[1] A golf ball having a core and a cover of one layer or a plurality of layers, wherein the core is formed of a material molded under heat from a rubber composition comprising the following components A to C:

(A) a base rubber,
(B) an organic peroxide, and
(C) water and/or a metal monocarboxylate, and has a hysteresis loss of 50% or less when compressed at a load cell speed of 500 mm/min and under a constant load of 5,000 N.

[2] The golf ball of [1], wherein the core has a JIS-C hardness difference obtained by subtracting the hardness at a center of the core from the hardness at a surface of the core which is at least 20.

[3] The golf ball of [1], wherein the core has a hardness at the interior thereof such that the value obtained by subtracting the JIS-C hardness $H_{5.0}$ at a position 5.0 mm outward from a center of the core and toward a periphery of the core from the JIS-C hardness $H_{15.0}$ at a position 15.0 mm outward from the core center and toward the core periphery is a positive value.

[4] The golf ball of [1], wherein the core has a diameter of not more than 42.0 mm and a deflection when compressed under a final load of 1,275 N (130 kgf) from an initial load state of 98 N (10 kgf) of from 2.0 to 6.0 mm.

[5] The golf ball of [1], wherein the rubber composition before vulcanization has a moisture content of at least 1,000 ppm.

[6] The golf ball of [1], wherein the rubber composition includes from 0.1 to 5 parts by weight of an organosulfur compound per 100 parts by weight of the base rubber.

[7] The golf ball of [1], wherein the core after vulcanization has a higher moisture content at a center of the core than at a surface of the core.

[8] The golf ball of [1], wherein the product P×E of the difference P (mol/m$^3$) in crosslink density between a surface of core and a center of the core, as measured based on a toluene swelling test, multiplied by the deflection E (mm) of the core when compressed under a final load of 1,275 N (130 kgf) from an initial load state of 98 N (10 kgf) is at least 28×10$^2$ mol/m$^3$·mm.

[9] The golf ball of [1] wherein, when the loss tangent of a center of the core is measured at a temperature of −12° C. and a frequency of 15 Hz, letting tan $\delta_1$ be the loss tangent at a dynamic strain of 1% and tan $\delta_{10}$ be the loss tangent at a dynamic strain of 10%, the slope of these tan $\delta$ values, expressed as [(tan $\delta_{10}$−tan $\delta_1$)/(10%−1%)], is not more than 0.003.

[10] The golf ball of [1], wherein each layer of the cover has a thickness in the range of from 0.5 to 2.5 mm.

[11] The golf ball of [1], wherein at least one layer of the cover is formed of a resin composition containing at least one of (I) and (II) below:

(I) an ionic or nonionic olefin-unsaturated carboxylic acid copolymer, (II) an ionic or nonionic olefin-unsaturated carboxylic acid-carboxylic acid ester copolymer.

[12] The golf ball of claim [11], wherein copolymers (I) and (II) have a base monomer that is ethylenic.

[13] The golf ball of [11], wherein the carboxylic acid in ionic copolymers (I) and (II) is at least 30 mol % neutralized.

DETAILED DESCRIPTION OF THE INVENTION

The invention is described more fully below.

The golf ball of the invention has a core and a cover of one layer or a plurality of layers. The core is not limited only to one layer and may, if necessary, be constructed of two or more layers. The core is formed of a material molded under heat from a rubber composition containing as the essential ingredients the following components A to C:

(A) a base rubber,
(B) an organic peroxide, and
(C) water and/or a metal monocarboxylate.

The base rubber serving as component A is not particularly limited, although the use of polybutadiene is especially preferred.

It is desirable for the polybutadiene to have a cis-1,4 bond content on the polymer chain of at least 60 wt %, preferably at least 80 wt %, more preferably at least 90 wt %, and most preferably at least 95 wt %. If the content of cis-1,4 bonds among the bonds on the polybutadiene molecule is too low, the resilience may decrease.

The content of 1,2-vinyl bonds included on the polybutadiene is typically not more than 2%, preferably not more than 1.7%, and more preferably not more than 1.5%, of the polymer chain. If the content of 1,2-vinyl bonds is too high, the resilience may decrease.

The polybutadiene has a Mooney viscosity (ML$_{1+4}$ (100° C.)) of preferably at least 20, and more preferably at least 30, with the upper limit being preferably not more than 120, more preferably not more than 100, and even more preferably not more than 80.

The term "Mooney viscosity" used herein refers to an industrial indicator of viscosity (JIS K6300) measured with a Mooney viscometer, which is a type of rotary plastometer. This value is represented by the unit symbol ML$_{1+4}$ (100° C.), wherein "M" stands for Mooney viscosity, "L" stands for large rotor (L-type), and "1+4" stands for a pre-heating time of 1 minute and a rotor rotation time of 4 minutes. The "100° C." indicates that measurement was carried out at a temperature of 100° C.

The polybutadiene used may be one synthesized using a rare-earth catalyst or a group VIII metal compound catalyst. In this invention, the use of a polybutadiene synthesized with a rare-earth catalyst is especially preferred. Where necessary, an organoaluminum compound, an alumoxane, a halogen-containing compound and a Lewis base may optionally be used in combination with such a catalyst. In the practice of the invention, preferred use may be made of, as the various foregoing compounds, those mentioned in JP-A H11-35633.

Of the above rare-earth catalysts, the use of a neodymium catalyst that uses in particular a neodymium compound, which is a lanthanum series rare-earth compound, is especially recommended. In such cases, a polybutadiene rubber having a high cis-1,4 bond content and a low 1,2-vinyl bond content can be obtained at an excellent polymerization activity.

A polybutadiene rubber synthesized with a catalyst differing from the above lanthanum rare-earth compound may be included in the base rubber. In addition, styrene-butadiene rubber (SBR), natural rubber, polyisoprene rubber, ethylene-propylene-diene rubber (EPDM) or the like may also be included. These may be used singly or two or more may be used in combination.

The organic peroxide (component B) used in the invention is not particularly limited, although the use of an organic peroxide having a one-minute half-life temperature of 110 to 185° C. is preferred. A single organic peroxide, or two or more organic peroxides, may be used. The amount of organic peroxide included per 100 parts by weight of the base rubber is preferably at least 0.1 part by weight, and more preferably at least 0.3 part by weight. The upper limit is preferably not more than 5 parts by weight, more preferably not more than 4 parts by weight, and even more preferably not more than 3 parts by weight. A commercially available product may be used as the organic peroxide. Specific examples include those available under the trade names Percumyl D, Perhexa C-40, Niper BW and Peroyl L (all produced by NOF Corporation), and Luperco 231XL (from Atochem Co.).

The water serving as component C in the invention is not particularly limited, and may be distilled water or may be tap water. The use of distilled water free of impurities is especially preferred. The amount of water included per 100 parts by weight of the base rubber is preferably at least 0.1 part by weight, and more preferably at least 0.3 part by weight. The upper limit is preferably not more than 5 parts by weight, and more preferably not more than 4 parts by weight.

By including a suitable amount of such water, the moisture content in the rubber composition before vulcanization becomes preferably at least 1,000 ppm, and more preferably at least 1,500 ppm. The upper limit is preferably not more than 8,500 ppm, and more preferably not more than 8,000 ppm. When the moisture content of the rubber composition is too low, it may be difficult to obtain a suitable crosslink density and tan $\delta$, which may make it difficult to mold a golf ball having little energy loss and a reduced spin rate. On the other hand, when the moisture content of the rubber composition is too high, the core may be too soft, which may make it difficult to obtain a suitable core initial velocity.

Although it is also possible to add water directly to the rubber composition, the following methods (i) to (iii) may be employed to incorporate water:
(i) applying water in the form of a mist, as steam or by means of ultrasound, to some or all of the rubber composition (compounded material);
(ii) immersing some or all of the rubber composition in water;
(iii) letting some or all of the rubber composition stand for a given period of time in a high-humidity environment in a place where the humidity can be controlled, such as a constant humidity chamber.

The "high-humidity environment" is not particularly limited, so long as it is an environment capable of moistening the rubber composition, although a humidity of from 40 to 100% is preferred.

Alternatively, the water may be worked into a jelly state and added to the above rubber composition. Or a material obtained by first supporting water on a filler, unvulcanized rubber, rubber powder or the like may be added to the rubber composition. In such a form, the workability is better than when water is directly added to the composition, enabling the efficiency of golf ball production to be increased. The type of material in which a given amount of water has been included, although not particularly limited, is exemplified by fillers, unvulcanized rubbers and rubber powders in which sufficient water has been included. The use of a material which undergoes no loss of durability or resilience is especially preferred. The moisture content of the above material is preferably at least 3 wt %, more preferably at least 5 wt %, and even more preferably at least 10 wt %. The upper limit is preferably not more than 99 wt %, and even more preferably not more than 95 wt %.

In this invention, a metal monocarboxylate may be used instead of the above-described water. Metal monocarboxylates, in which the carboxylic acid is presumably coordination-bonded to the metal, are distinct from metal dicarboxylates such as zinc diacrylate of the formula ($CH_2$=CHCOO)$_2$Zn. A metal monocarboxylate introduces water into the rubber composition by way of a dehydration/condensation reaction, and thus provides an effect similar to that of water. Moreover, because a metal monocarboxylate can be added to a rubber composition as a powder, the operations can be simplified and uniform dispersion within the rubber composition is easy. In order to carry out the above reaction effectively, a monosalt is required. The amount of metal monocarboxylate included per 100 parts by weight of the base rubber is preferably at least 1 part by weight, and more preferably at least 3 parts by weight. The upper limit in the amount of metal monocarboxylate included is preferably not more than 60 parts by weight, and more preferably not more than 50 parts by weight. When the amount of metal monocarboxylate included is too small, it may be difficult to obtain a suitable crosslink density and tan $\delta$, as a result of which a sufficient golf ball spin rate-lowering effect may not be achievable. On the other hand, when too much is included, the core may become too hard, as a result of which it may be difficult for the ball to maintain a suitable feel at impact.

The carboxylic acid used may be, for example, acrylic acid, methacrylic acid, maleic acid, fumaric acid or stearic acid. Examples of the substituting metal include sodium, potassium, lithium, zinc, copper, magnesium, calcium, cobalt, nickel and lead, although the use of zinc is preferred. Illustrative examples of the metal monocarboxylate include zinc monoacrylate and zinc monomethacrylate, with the use of zinc monoacrylate being especially preferred.

In addition to above-described components A to C, it is possible to also include in the rubber composition: (D) an organosulfur compound, (E) a co-crosslinking agent, and (F) an inert filler. If necessary, an antioxidant may also be included. These ingredients are described in detail below.

(D) Organosulfur Compound

An organosulfur compound may be included in the rubber composition. The organosulfur compound is exemplified by, but not particularly limited to, thiophenols, thionaphthols, halogenated thiophenols, and metal salts thereof. Specific examples include the zinc salts of pentachlorothiophenol, pentafluorothiophenol, pentabromothiophenol and parachlorothiophenol, and diphenylpolysulfides, dibenzylpolysulfides, dibenzoylpolysulfides, dibenzothiazoylpolysulfides and dithiobenzoylpolysulfides having from 2 to 4 sulfurs. These may be used singly or two or more may be used in combination. Of the above, preferred use may be made of the zinc salt of pentachlorothiophenol and/or diphenyldisulfide.

It is recommended that the organosulfur compound be included in an amount, per 100 parts by weight of the base rubber, of preferably at least 0.1 part by weight, more preferably at least 0.2 part by weight, and even more preferably at least 0.5 part by weight, but preferably not more than 5 parts by weight, more preferably not more than 4 parts by weight, and even more preferably not more than 3 parts by weight. When the amount of organosulfur compound included is too large, the material molded under heat from the rubber composition may have a hardness that is too low. On the other hand, when the amount included is too small, an improvement in the resilience is unlikely to occur.

(E) Co-Crosslinking Agent

The co-crosslinking agent is a metal salt of an $\alpha,\beta$-unsaturated carboxylic acid having from 3 to 8 carbons. In the invention, "co-crosslinking agent" refers to a material which lacks the above-described dehydration reaction.

Illustrative examples of the $\alpha,\beta$-unsaturated carboxylic acid include acrylic acid, methacrylic acid, maleic acid and fumaric acid. Acrylic acid is preferred because it confers a high resilience. The metal of the metal salt is exemplified by zinc, sodium, magnesium, calcium and aluminum, with zinc being especially preferred. Accordingly, zinc acrylate is preferred as the co-crosslinking agent.

The co-crosslinking agent has an average particle size of preferably from 3 to 30 μm, more preferably from 5 to 25 μm, and even more preferably from 8 to 15 μm. When the co-crosslinking agent has an average particle size of less than 3 μm, it tends to aggregate within the rubber composition, as a result of which the reactivity between acrylic acid molecules increases and the reactivity between molecules of the base rubber decreases, which may make it impossible to obtain an acceptable golf ball rebound. On the other hand, when the co-crosslinking agent has an average particle size greater than 30 μm, the co-crosslinking agent particles end up being too large, leading to a large variability in the properties of the resulting golf ball. The co-crosslinking agent is included in an amount per 100 parts by weight of the base rubber which, although not particularly limited, is preferably from 3 to 60 parts by weight, more preferably from 5 to 45 parts by weight, and even more preferably from 20 to 40 parts by weight. When the amount included is less than the above range, the material molded under heat from the rubber composition may be too soft, resulting in a poor resilience. On the other hand, when the amount included is greater than the above range, the material molded under heat from the rubber composition may be too hard, resulting in a poor feel at impact.

As mentioned above, when a metal monocarboxylate is used instead of water in this invention, it is preferable for the relative proportions of the above co-crosslinking agent and the metal monocarboxylate, expressed as the weight ratio therebetween (metal monocarboxylate/co-crosslinking agent), to be within the range of 0.1 to 10.

(F) Inert Filler

Illustrative examples of inert fillers include inorganic fillers such as zinc oxide, barium sulfate and calcium carbonate. The amount of inert filler included per 100 parts by weight of the base rubber is preferably at least 1 part by weight, more preferably at least 3 parts by weight, and even more preferably at least 5 parts by weight. The upper limit is preferably not more than 100 parts by weight, more preferably not more than 60 parts by weight, even more preferably not more than 45 parts by weight, and most preferably not more than 40 parts by weight.

Antioxidant

In this invention, an antioxidant may be optionally included in the rubber composition. For example, use may be made of a commercially available product such as Nocrac NS-6, Nocrac NS-30 or Nocrac 200 (all products of Ouchi Shinko Chemical Industry Co., Ltd.). These may be used singly or two or more may be used in combination. The amount of antioxidant included is not particularly limited, and may be set to preferably at least 0.1 part by weight, and more preferably at least 0.15 part by weight, per 100 parts by weight of the base rubber. The upper limit may be set to preferably not more than 5.0 parts by weight, more preferably not more than 4.0 parts by weight, and even more preferably not more than 3.0 parts by weight. When too much or too little antioxidant is included, an optimal core hardness gradient may not be obtained, which may make it impossible to achieve a good rebound, durability and spin rate-lowering effect on full shots.

The core in this invention can be obtained by using a method similar to that employed in conventional golf ball rubber compositions to vulcanize and cure the above-described rubber composition. Exemplary vulcanization conditions include a vulcanization temperature of between 100 and 200° C. and a vulcanization time of between 5 and 40 minutes.

It is recommended that the core diameter have an upper limit of preferably not more than 42.0 mm and a lower limit of preferably at least 25 mm, and more preferably at least 30 mm. When the core diameter is smaller than the above value, it may not be possible to obtain a sufficient spin-rate lowering effect.

The deflection of the core (material molded under heat) when compressed under a final load of 1,275 N (130 kgf) from an initial load of 98 N (10 kgf) is not particularly limited, although it is recommended that this be preferably at least 2.0 mm, more preferably at least 2.5 mm, and even more preferably at least 3.0 mm, with the upper limit being preferably not more than 6.0 mm, more preferably not more than 5.0 mm, and even more preferably not more than 4.5 mm. When the core deflection is larger than the above value, even at an improved hysteresis loss for the core, the deflection of the finished ball may become large, possibly resulting in a decreased rebound. On the other hand, when the core deflection is smaller than the above value, the feel of the ball at impact may become too hard.

Next, the core hardness is explained.

The core has a center hardness expressed in terms of DIS-C hardness which, although not particularly limited, is preferably at least 45, more preferably at least 50, and even more preferably at least 52. The upper limit is preferably not more than 70, more preferably not more than 65, and even more preferably not more than 60. At a core center hardness outside of this range, the feel at impact may worsen, the durability may decrease, and it may not be possible to obtain a spin rate-lowering effect.

The core has a surface hardness expressed in terms of JIS-C hardness which, although not particularly limited, is preferably at least 65, more preferably at least 70, and even more preferably at least 72. The upper limit is preferably not more than 95, more preferably not more than 90, and even more preferably not more than 88. At a core surface hardness lower than this range, the rebound may decrease and a sufficient distance may not be obtained. On the other hand, at a core surface hardness higher than this range, the feel at impact may be too hard.

The JIS-C hardness difference obtained by subtracting the core center hardness from the core surface hardness (core surface hardness—core center hardness), although not particularly limited, is preferably at least 15, more preferably at least 17, and even more preferably at least 20. The upper limit is preferably not more than 40, more preferably not more than 35, and even more preferably not more than 30. At a hardness difference that is too small, even when a good ball rebound can be obtained, a spin rate-lowering effect may not be achieved, as a result of which the distance may decrease.

The core preferably has a hardness at the interior thereof such that the value obtained by subtracting the JIS-C hardness $H_{5.0}$ at a position 5.0 mm outward from a center of the core and toward a periphery of the core from the JIS-C hardness $H_{15.0}$ at a position 15.0 mm outward from the core center and toward the core periphery is a positive value. When the $H_{15.0}$-$H_{5.0}$ value is zero or negative, the core hardness gradient ceases to be one where the hardness gradually increases toward the outside. When such a hardness difference either does not exist or is negative rather than positive, the spin rate-lowering effect that should be obtained may not ultimately be obtained.

The center hardness and the cross-sectional hardnesses at specific positions refer herein to the hardnesses measured at the center and specific positions on a cross-section obtained by cutting the core in half (through the center), and the surface hardness refers to the hardness measured at the core surface (spherical surface). Also, "JIS-C hardness" refers to a hardness measured with the spring-type durometer (JIS-C model) specified in JIS K 6301-1975.

In this invention, it is preferable for the core center in the vulcanized core to have a higher moisture content than the core surface. The moisture content of the molded core can be suitably controlled by means of, for example, the amount of water included in the rubber composition, the molding temperature and the molding time.

The moisture content at the core center, although not particularly limited, is preferably at least 1,000 ppm, more preferably at least 1,200 ppm, and even more preferably at least 1,500 ppm. The upper limit is preferably not more than 7,000 ppm, more preferably not more than 6,000 ppm, and even more preferably not more than 5,000 ppm. The moisture content at the core surface, although not particularly limited, is preferably at least 800 ppm, more preferably at least 1,000 ppm, and even more preferably at least 1,200 ppm. The upper limit is preferably not more than 5,000 ppm, more preferably not more than 4,000 ppm, and even more preferably not more than 3,000 ppm. The (core surface moisture content—core center moisture content) value is preferably 0 ppm or below, more preferably −100 ppm or below, and even more preferably −200 ppm or below. The lower limit value is preferably −1,000 ppm or above, more preferably −700 ppm or above, and even more preferably −600 ppm or above.

Measurement of the above moisture content may be carried out with ordinary instruments. For example, the moisture content can be measuring using the AQ-2100 coulometric Karl Fischer titrator and the EV-2000 evaporator (both available from Hiranuma Sangyo Co., Ltd.) at a measurement temperature of 130° C., a preheating time of 3 minutes and a background measurement time of 30 seconds.

Letting $V_0$ be the initial velocity of the core measured after removing the cover from a ball obtained by molding a cover material over a core and letting $V_{60}$ be the initial velocity of the core measured 60 days after the day on which $V_0$ was measured, $V_0$ is preferably at least 77.0 m/s, more preferably at least 77.1 m/s, and even more preferably at least 77.2 m/s, but preferably not more than 78.5 m/s, more preferably not more than 78.3 m/s, and even more preferably not more than 78.0 m/s. $V_{60}$ is preferably at least 77.0 m/s, and more preferably at least 77.1 m/s, but preferably not more than 77.8 m/s, more preferably not more than 77.7 m/s, and even more preferably not more than 77.6 m/s. In cases where core initial velocities $V_0$ and $V_{60}$ within the above ranges cannot be obtained, achieving a satisfactory distance is difficult. Also, when the core initial velocity is too high, the golf ball may not conform to the Rules of Golf.

The value $V_0$-$V_{60}$ preferably satisfies the relationship $V_0$-$V_{60}$<0.7, more preferably satisfies the relationship $V_0$-$V_{60}$<0.6, and still more preferably satisfies the relationship $V_0$-$V_{60}$<0.5. In this invention, when moisture has been included in a good balance within the core, even if the core comes directly into contact with the atmosphere, it is not readily influenced by the humidity, enabling changes in the core initial velocity to be suppressed.

In this invention, the core initial velocity may be measured using an initial velocity measuring apparatus of the same type as the USGA drum rotation-type initial velocity instrument approved by the R&A. In such cases, the core may be tested in a chamber at a room temperature of 23±2° C. after being held isothermally in a 23±1° C. environment for at least 3 hours.

Next, the crosslink density of the core is explained.

In this invention, the crosslink density at the center of the core is preferably at least $6.0 \times 10^2$ mol/m$^3$, more preferably at least $7.0 \times 10^2$ mol/m$^3$, and even more preferably at least $8.0 \times 10^2$ mol/m$^3$. The upper limit value is preferably not more than $15.0 \times 10^2$ mol/m$^3$, more preferably not more than $14.0 \times 10^2$ mol/m$^3$, and even more preferably not more than $13.0 \times 10^2$ mol/m$^3$. Also, the crosslink density at the surface of the core is preferably at least $13.0 \times 10^2$ mol/m$^3$, more preferably at least $14.0 \times 10^2$ mol/m$^3$, and even more preferably at least $15.0 \times 10^2$ mol/m$^3$. The upper limit value is preferably not more than $30.0 \times 10^2$ mol/m$^3$, more preferably not more than $28.0 \times 10^2$ mol/m$^3$, and even more preferably not more than $26.0 \times 10^2$ mol/m$^3$. The difference in crosslink density between the core center and the core surface, expressed as (crosslink density at core surface)−(crosslink density at core center), is preferably at least $9.0 \times 10^2$ mol/m$^3$ and preferably not more than $30.0 \times 10^2$ mol/m$^3$. When the crosslink density at the core center or the core surface falls outside of the above ranges, the water within the rubber composition may not fully contribute to decomposition of the organic peroxide during vulcanization, as a result of which a sufficient spin rate-lowering effect on the ball may not be obtained.

The crosslink density can be measured by the following procedure.

A flat disk having a thickness of 2 mm is cut out by passing through the geometric center of the core. Next, using a punching machine, samples having a diameter of 3 mm are punched from the flat disk at the core center and at places of measurement not more than 4 mm inward of respective sites corresponding to the core surface, and the sample weights are measured with an electronic balance capable of measurement in units of two decimal places (mg). The sample and 8 mL of toluene are placed in a 10 mL vial and the vial is closed with a stopper and left at rest for at least 72 hours, following which the solution is discarded and the sample weight following immersion is measured. Using the Flory-Rehner equation, the crosslink density of the rubber composition is calculated from the sample weights before and after swelling.

$$\nu = -(\ln(1-v_r) + v_r + \chi v_r^2)/V_S(v_r^{1/3} - v_r/2)$$

(where $\nu$ is the crosslink density, $v_r$ is the volume fraction of rubber in the swollen sample, $\chi$ is an interaction coefficient, and $V_s$ is the molar volume of toluene)

$$v_r = V_{BR}/(V_{BR} + V_T)$$

$$V_{BR} = (w_f - w_f v_f)/\rho$$

$$V_T = (w_s - w_f)/\rho_T$$

(where $V_{BR}$ is the volume of butadiene rubber in the rubber composition, $V_T$ is the volume of toluene in the swollen sample, $v_f$ is the weight fraction of filler in the rubber composition, $\rho$ is the density of the rubber composition, $w_f$ is the sample weight before immersion, $w_s$ is the sample weight after immersion, and $\rho_T$ is the density of toluene)

Calculation is carried out at a $V_s$ value of $0.1063 \times 10^{-3}$ m³/mol, a $\rho_T$ value of 0.8669, and at a value for $\chi$, based on the literature (*Macromolecules* 2007, 40, 3669-3675), of 0.47.

Next, the product P×E of the difference in crosslink density P (mol/m³) between the core surface and the core center, expressed as (crosslink density at core surface)–(crosslink density at core center), multiplied by the deflection E (mm) of the core when compressed under a final load of 1,275 N (130 kgf) from an initial load state of 98 N (10 kgf) is explained. Generally, as the core hardness becomes higher, i.e., as the core deflection E (mm) becomes smaller, the difference P (mol/m³) in crosslink density tends to become larger. By multiplying P by E as described above, the influence of the core hardness can be canceled out, enabling the value P×E to serve as an indicator of the reduction in spin rate. The P×E value is preferably at least $26 \times 10^2$ mol/m³·mm, more preferably at least $27 \times 10^2$ mol/m³·mm, and even preferably at least $28 \times 10^2$ mol/m³·mm. As explained above, with the emergence of a difference in crosslink density between the core center and the core surface, a golf ball can be obtained which has a lower spin rate and a higher durability and which, even with use over an extended period of time, does not undergo a decline in initial velocity.

Next, the method of measuring the dynamic viscoelasticity of the core is explained.

Generally, the viscoelasticity of a rubber material is known to have a strong influence on the performance of rubber products. Also, with regard to the loss tangent (tan δ), which represents the ratio of energy lost to energy stored, it is known that a smaller tan δ is associated with a larger contribution by the elasticity component in rubber, and that a larger tan δ is associated with a larger contribution by the viscosity component. In this invention, in a dynamic viscoelasticity test on vulcanized rubber at the core center in which measurement is carried out at a temperature of –12° C. and a frequency of 15 Hz, letting tan $\delta_1$ be the loss tangent at a dynamic strain of 1% and tan $\delta_{10}$ be the loss tangent at a dynamic strain of 10%, the slope of these tan δ values, expressed as [(tan $\delta_{10}$–tan $\delta_1$)/(10%–1%)], is preferably not more than 0.003, and more preferably not more than 0.002. When the above tan δ values becomes larger, the energy loss by the core may become too large, which may make it difficult to obtain a satisfactory rebound and a spin rate-lowering effect. Various methods may be employed to measure the dynamic viscoelasticity performance of the core. In one such method, a circular disk having a thickness of 2 mm is cut out of the core encased by the cover by passing through the geometric center thereof, following which, with this as the sample, a punching press is used to punch out a 3 mm diameter specimen at the place of measurement. In addition, by employing a dynamic viscoelasticity measuring apparatus (such as that available under the product name EPLEXOR 500N from GABO) and using a compression test holder, the tan δ values under dynamic strains of 0.01 to 10% can be measured at an initial strain of 35%, a measurement temperature of –12° C. and a frequency of 15 Hz, and the slope determined based on the results of these measurements.

In this invention, the core is specified as having a hysteresis loss of 50% or less when compressed at a load cell speed of 500 mm/min and under a constant load of 5,000 N. When the hysteresis loss is more than 50%, most of the load energy incurred when the ball is struck dissipates as thermal energy. That is, the energy that should be conveyed to the ball diminishes, which may lead to decrease in rebound by the manufactured ball or an increased spin rate. Measurement of the hysteresis loss can be carried out using, for example, a tensile/compressive testing machine. In the case of a core (or ball), the hysteresis loss when a compressive load has been applied is measured. The test conditions are set to a load cell speed of 500 mm/min and a constant load of 5,000 N.

Next, the cover of one layer or a plurality of layers encasing the core is described.

The cover material is not particularly limited, although use may be made of known materials such as various ionomeric resins and urethane elastomers that are used in golf balls.

In order to more fully achieve a lower spin rate for the ball, it is preferable for at least one layer of the cover to be formed of a resin composition containing at least one of (I) and (II) below:

(I) an ionic or nonionic olefin-unsaturated carboxylic acid copolymer, (II) an ionic or nonionic olefin-unsaturated carboxylic acid-carboxylic acid ester copolymer.

The olefin component in the copolymers of (I) and (II) preferably has from 2 to 6 carbon atoms, and is most preferably ethylene. Also, the unsaturated carboxylic acid in the copolymers of (I) and (II) is preferably acrylic acid or methacrylic acid, and the content (acid content) is preferably from 2 to 25 wt %.

The unsaturated carboxylic acid ester in the copolymers of (II) is preferably a lower alkyl ester, and most preferably butyl acrylate (n-butyl acrylate, i-butyl acrylate). When the copolymer of (I) or (II) is an ionic copolymer, the degree of neutralization of the unsaturated carboxylic acid is preferably at least 30 mol %.

A fatty acid and/or derivative thereof having a molecular weight of from 228 to 1500 and a basic inorganic compound capable of neutralizing un-neutralized acid groups may be suitably included in the resin composition containing the copolymer of (I) and (II) above. In addition, various additives such as agents for adjusting the specific gravity or weight or for coloration may be suitably included in this resin composition.

To obtain the cover in this invention, use may be made of, for example, a method that involves placing a single-layer core or a multilayer core of two or more layers that has been prefabricated according to the type of ball within a mold, mixing and melting the above mixture under applied heat, and injection-molding the molten mixture over the core so as to encase the core with the desired cover. In this case, cover production can be carried out in a state where excellent thermal stability, flowability and processability have been achieved. As a result, the golf ball ultimately obtained has a high rebound, and moreover has a good feel at impact and an excellent scuff resistance. Alternatively, use may be made of a cover-forming method other than the foregoing, such as one in which, for example, a pair of hemispherical half-cups are molded beforehand from the cover material of the invention, following which the core is enclosed within the half-cups and molding is carried out under applied pressure at 120 to 170° C. for 1 to 5 minutes.

In cases where the cover has only one layer, the thickness of that layer may be set to from 0.3 to 3 mm. In cases where the cover has two layers, the thickness of the outer cover layer may be set in the range of 0.3 to 2.0 mm, and the thickness of the inner cover layer may be set in the range of 0.3 to 2.0 mm. The Shore D hardnesses of the respective layers making up the cover (cover layers) are not particularly limited, but are preferably at least 40, and more preferably at least 45. The upper limit is preferably not more than 70, and more preferably not more than 65.

Numerous dimples are formed on the surface of the outermost layer of the cover, in addition to which the cover may be subjected to various types of treatment, such as surface preparation, stamping and painting. Particularly in cases where such surface treatment is imparted to the cover formed of the inventive cover material, the good moldability of the cover surface enables surface treatment to be carried out effectively.

The invention provides a golf ball in which the above-described rubber composition is used as the core material for at least one core layer. The type of golf ball is not particularly limited, provided the ball has a core and at least one cover layer. For example, the rubber composition may be used in the core of a solid golf ball, such as a two-piece or three-piece solid golf ball having a solid core encased by a cover or a multi-piece golf ball having a construction of three or more layers, or as the core in a wound golf ball composed of a wound core encased by a single layer cover or a cover having a multilayer construction of two or more layers.

As described above, because the golf ball of the invention is able to obtain a core material which increases the mechanical energy that should be fully transmitted to the manufactured ball and thus has a low energy loss, the ball has a higher rebound and a better spin rate-lowering effect and thus travels farther. Moreover, the ball has an excellent durability.

EXAMPLES

Examples of the invention and Comparative Examples are given below by way of illustration, although the invention is not limited by the following Examples.

Examples 1 to 8, Comparative Examples 1 to 5

Cores for Examples 1 to 8 of the invention and Comparative Examples 1 to 5 were produced using the core materials composed primarily of polybutadiene shown in Table 1 below.

Zinc oxide: Trade name, "Zinc Oxide Grade 3" (from Sakai Chemical Co., Ltd.)
Barium sulfate: Trade name, "Barico #100" (from Hakusui Tech Co., Ltd.)
Antioxidant: Trade name, "Nocrac NS-6" (from Ouchi Shinko Chemical Industry Co., Ltd.)
Zinc salt of pentachlorothiophenol:
  Available from Wako Pure Chemical Industries, Ltd.
Zinc acrylate: Available from Nippon Shokubai Co., Ltd.
Water: Distilled water from Wako Pure Chemical Industries, Ltd.
Organic Peroxide: Dicumyl peroxide, available under the trade name "Percumyl D" from NOF Corporation Each of the cores produced as described above was tested for deformation under a specific load, hardness profile, moisture content, crosslink density, dynamic viscoelastic properties, initial velocity of core after standing, and hysteresis loss (%). The results are shown in Tables 3 and 4.

Deflection of Core Under Specific Load

The deflection of the core when compressed under a final load of 1,275 N (130 kgf) from an initial load state of 98 N (10 kgf) was measured. The average values for 30 cores (N=30) are shown in Tables 3 and 4.

Core Hardness Profile

The indenter of a durometer was set so as to be substantially perpendicular to the spherical surface of the core, and the core surface hardness in terms of JIS-C hardness was measured as specified in JIS K6301-1975. To obtain the cross-sectional hardnesses at the center and other specific positions of the core, the core was hemispherically cut so as form a planar cross-section, and measurements were carried out by pressing the indenter of a durometer perpendicularly against the cross-section at the measurement positions. These hardnesses are indicated as JIS-C hardness values.

Core Moisture Content

Measurement of the moisture content was carried out at using the AQ-2100 coulometric Karl Fischer titrator and the

TABLE 1

| (pbw) | Example 1 | Example 2 | Example 3 | Example 4 | Comparative Example 1 | Comparative Example 2 | Example 5 | Example 6 | Example 7 | Example 8 | Comparative Example 3 | Comparative Example 4 | Comparative Example 5 |
|---|---|---|---|---|---|---|---|---|---|---|---|---|---|
| Polybutadiene: BR51 | 100 | 100 | 100 | 100 | 100 | 100 | 100 | 100 | 100 | 100 | 100 | 100 | 100 |
| Polybutadiene: BR01 | | | | | | | | | | | | | |
| Zinc oxide | 4 | 4 | 4 | 4 | 4 | 4 | 4 | 4 | 4 | 4 | 4 | 4 | 4 |
| Barium sulfate | specific gravity modification | | | | | | | | | | | | |
| Antioxidant | 0.1 | 0.1 | 0.1 | 0.1 | 0.1 | 0.1 | 0.1 | 0.1 | 0.1 | 0.1 | 0.1 | 0.1 | 0.1 |
| Zinc salt of pentachlorothiophenol | 0.6 | 0.6 | 0.6 | 0.6 | 0.6 | 0.6 | 0.6 | 0.6 | 0.6 | 0.6 | 0.6 | 0.6 | 0.6 |
| Zinc acrylate | 36 | 36 | 36 | 36 | 36 | 28 | 39 | 33 | 36 | 36 | 35 | 35 | 28 |
| Water | 0.5 | 1 | 1.5 | 5 | | | 1 | 1 | 1 | 1 | | | |
| Zinc monocarboxylate | | | | | | | | | | | | | |
| Organic peroxide | 1 | 1 | 1 | 1 | 1 | 1 | 1 | 1 | 1 | 1 | 1 | 1 | 1 |
| Moisture content of mixed rubber (ppm) | 2,077 | 2,661 | 3,184 | 7,130 | 784 | 801 | 2,657 | 2,621 | 2,704 | 2,670 | 756 | 721 | 812 |

Details on the above formulations are given below.

Polybutadiene rubber: Trade name, "BR 51" (from JSR Corporation); polymerized with a neodymium catalyst Polybutadiene rubber: Trade name, "BR 01" (from JSR Corporation); polymerized with a nickel catalyst EV-2000 evaporator (both available from Hiranuma Sangyo Corporation) at a measurement temperature of 130° C., a preheating time of 3 minutes and a background measurement time of 30 seconds. The Interval Time was set to 99 seconds, and the Current was set to "Fast." Measurement results within a radius of 5 mm from the core center were treated as core center moisture contents, and measurement results within 5 mm of the core surface were treated as core outside moisture contents.

Crosslink Density of Core (Toluene Swelling Test)

A flat disk having a thickness of 2 mm was cut out by passing through the geometric center of the core. Next, using a punching machine, samples having a diameter of 3 mm were punched from the flat disk at the places of measurement, and the sample weights were measured using an electronic balance capable of measurement in units of two decimal places (mg). The sample and 8 mL of toluene were added to a 10 mL vial, following which the vial was closed with a stopper and left at rest. After 72 hours had elapsed, the liquid within the vial was discarded and the sample weight following immersion was measured. Using the Flory-Rehner equation, the crosslink density of the rubber composition was calculated from the sample weights before and after swelling.

$$\nu = -(\ln(1-v_r) + v_r + \chi v_r^2)/V_S(v_r^{1/3} - v_r/2)$$

(where $\nu$ is the crosslink density, $v_r$ is the volume fraction of rubber in the swollen sample, $\chi$ is an interaction coefficient, and $V_S$ is the molar volume of toluene)

$$v_r = V_{BR}/(V_{BR} + V_T)$$

$$V_{BR} = (w_f - w_f v_f)/\rho$$

$$V_T = (w_s - w_r)/\rho_T$$

(where $V_{BR}$ is the volume of butadiene rubber in the rubber composition, $V_T$ is the volume of toluene in the swollen sample, $v_f$ is the weight fraction of filler in the rubber composition, $\rho$ is the density of the rubber composition, $w_f$ is the sample weight before immersion, $w_s$ is the sample weight after immersion, and $\rho_T$ is the density of toluene)

Calculation was carried out at a $V_s$ value of $0.1063 \times 10^{-3}$ m$^3$/mol, a $\rho_T$ value of 0.8669, and at a value for $\chi$, based on the literature (*Macromolecules* 2007, 40, 3669-3675), of 0.47.

Dynamic Viscoelastic Properties of Core

A circular disk having a thickness of 2 mm was cut out by passing through the geometric center of the core. Using this as the sample, 3 mm diameter specimens were punched out at the places of measurement. By employing a dynamic viscoelasticity measuring apparatus (such as that available under the product name EPLEXOR 500N from GABO) and using a compression test holder, the loss tangents (tan δ) under dynamic strains of 0.01 to 10% were measured at an initial strain of 35%, a measurement temperature of −12° C. and a frequency of 15 Hz.

Initial Velocity After Core Standing

A core was prepared by peeling the cover from a golf ball. Letting the core initial velocity measured on the day that the cover was peeled off be the Day 0 result, the initial core velocities when 30 days and 60 days had elapsed thereafter were treated as the Day 30 and Day 60 results. The core was left standing in a chamber controlled to a temperature of 24° C. and 40% humidity. The initial velocity was measured using an initial velocity measuring apparatus of the same type as the USGA drum rotation-type initial velocity instrument approved by the R&A. The core was tested in a chamber at a room temperature of 23±2° C. after being held isothermally in a 23±1° C. environment for at least 3 hours. Twenty balls were each hit twice. The time taken for the ball to traverse a distance of 6.28 ft (1.91 m) was measured and used to compute the initial velocity. This cycle was carried out over a period of about 15 minutes.

Hysteresis Loss (%) of Core

Using the tensile/compressive testing machine available from A&D Company, Ltd. under the product name Tensilon RTG-1310, the core was set in a compression test jig and the hysteresis loss (%) of the core in each Example was determined at a load cell speed of 500 mm/min and a constant load of 5,000 N. The number of measurements for a single core was set to 5 (N=5). The average of the measurements for each core are shown in Tables 3 and 4.

Next, using a three-layer cover (envelope layer, intermediate layer and outermost layer) or a two-layer cover (intermediate layer and outermost layer) having the properties shown in Table 2 below, a multi-piece solid golf ball having a four-layer construction or a three-layer construction composed of a core encased by, in order, an envelope layer (where appropriate), an intermediate layer and an outermost layer was obtained for each of the cores produced above. Although not shown in a diagram, dimples in a certain pattern common to each ball were formed on the surface of the ball cover in all of the Examples according to the invention and the Comparative Examples.

TABLE 2

|  |  | Examples 1 to 4 Comparative Example 1, 2 | Examples 5, 6 Comparative Example 3 | Example 7 Comparative Example 4 | Example 8 Comparative Example 5 |
|---|---|---|---|---|---|
| Outermost layer | Material | urethane[*1] | urethane[*1] | urethane[*1] | urethane[*1] |
|  | Thickness (mm) | 0.8 | 0.8 | 0.8 | 0.8 |
| Intermediate layer | Material | ionomer[*2] | ionomer[*2] | ionomer[*2] | ionomer[*2] |
|  | Thickness (mm) | 1.13 | 1.1 | 1.3 | 1.05 |
| Envelope layer (layer adjoining core) | Material | ionomer[*3] | ionomer[*3] | ionomer[*3] | none |
|  | Thickness (mm) | 1.35 | 1.0 | 1.5 |  |

[*1] A urethane compound using three types of urethane: Pandex T8283, Pandex T8290 and Pandex T8295, all from DIC-Bayer Polymer, Ltd.
[*2] An ionomer compound using three types of ionomer: Himilan 1605, Himilan 1706 and Himilan 1557, all from DuPont-Mitsui Polychemicals Co., Ltd.
[*3] HPF1000, from E.I. DuPont de Nemours & Co.

The properties (spin rate, feel, durability) of the golf balls in these Examples and Comparative Examples were evaluated as follows. The results are presented in Table 3 and 4.

Evaluation of Ball Properties

Ball Deflection (mm)

The deflection (mm) of a golf ball when compressed under a final load of 1,275 N (130 kgf) from an initial load state of 98 N (10 kgf) was measured.

Spin Rate of Ball (rpm)

A driver (W#1) manufactured by Bridgestone Sports Co., Ltd. (TourStage ViQ, 2012 model; loft angle, 11.5°) was mounted on a golf swing robot and used to strike balls at a head speed (HS) of 45 m/s. A number 6 iron (I#6) manufactured by Bridgestone Sports Co., Ltd. (TourStage ViQ, 2012 model) was mounted on a golf swing robot and used to strike balls at a head speed (HS) of 38 m/s. The balls immediately after being struck were measured with an apparatus for measuring the initial conditions.

Durability of Ball

The durability of the golf ball was evaluated using an ADC Ball COR Durability Tester produced by Automated Design Corporation (U.S.). This tester fires a golf ball pneumatically and causes it to repeatedly strike two metal plates arranged in parallel. The incident velocity against the metal plates was set at 43 m/s. The number of shots required for the golf ball to crack was measured, and the average value obtained from measurements for five golf balls (N=5) was determined.
Good: 100 shots or more
Fair: from 50 to 99 shots
NG: 49 shots or less Feel of Ball at Impact Using a W#1 golf club, sensory evaluations were carried out under the following criteria by ten amateur golfers having head speeds of 35 to 40 m/s.
Good: at least seven of the ten golfers experienced a good feel at impact
Fair: five or six of the ten golfers experienced a good feel at impact
NG: four or fewer of the ten golfers experienced a good feel at impact

TABLE 3

| | | | Example | | | | Comparative Example | |
|---|---|---|---|---|---|---|---|---|
| | | | 1 | 2 | 3 | 4 | 1 | 2 |
| Core properties | Diameter (mm) | Average | 36.95 | 36.96 | 36.95 | 36.96 | 36.85 | 36.85 |
| | Weight (g) | Average | 32.01 | 32.03 | 32.03 | 32.03 | 31.80 | 31.80 |
| | Deflection under load (nm) | Average: E | 3.35 | 3.89 | 3.86 | 4.08 | 2.72 | 3.80 |
| Hardness profile (JIS-C) | Center | | 60.8 | 56.5 | 54.3 | 52.5 | 66.4 | 63.2 |
| | H5.0 | | 64.1 | 60.0 | 57.8 | 56.6 | 68.0 | 65.2 |
| | H15.0 | | 77.5 | 74.3 | 72.7 | 74.9 | 74.4 | 71.0 |
| | Surface | | 85.0 | 83.6 | 83.8 | 82.1 | 84.0 | 80.2 |
| | Surface – Center | | 24.3 | 27.2 | 29.5 | 29.6 | 17.6 | 17.0 |
| | H15.0 – H5.0 | | 13.4 | 14.3 | 14.9 | 18.3 | 6.4 | 5.8 |
| Core moisture content (ppm) | Center | | 1,501 | 2,003 | 2,437 | 2,870 | 884 | 737 |
| | Surface | | 1,421 | 1,565 | 1,871 | 2,020 | 1,621 | 1,669 |
| | Surface – Center | | −80 | −438 | −566 | −850 | 737 | 932 |
| Crosslink density | ($\times 10^2$ mol/m$^3$) | Center | 10.8 | 9.1 | 10.6 | 11.0 | 13.3 | 10.3 |
| | | Intermediate | 11.7 | 10.2 | 11.0 | 11.3 | 13.1 | 10.8 |
| | | Outside | 20.3 | 20.3 | 24.8 | 25.4 | 21.9 | 17.2 |
| | | Outside – Center: P | 9.5 | 12.9 | 14.2 | 14.4 | 8.5 | 6.8 |
| | ($\times 10^2$ mol/m$^3$ · mm) | P × E | 31.7 | 50.1 | 54.7 | 58.8 | 23.2 | 25.9 |
| Tan δ at core center | 0.1% strain | | 0.047 | 0.039 | 0.038 | 0.045 | 0.054 | 0.049 |
| | 1% strain | | 0.052 | 0.039 | 0.039 | 0.047 | 0.061 | 0.048 |
| | 10% strain | | 0.066 | 0.054 | 0.053 | 0.061 | 0.097 | 0.093 |
| | Slope between 10% strain and 1% strain | | 0.0016 | 0.0017 | 0.0016 | 0.0016 | 0.004 | 0.005 |
| Initial velocity after core standing (m/s) | 0 days of standing (V0) | | 77.55 | 77.32 | 77.30 | 76.90 | 78.05 | 77.28 |
| | 30 days of standing (V30) | | 77.29 | 77.11 | 77.08 | 76.68 | 77.71 | 76.95 |
| | 60 days of standing (V60) | | 77.07 | 76.93 | 76.92 | 76.50 | 77.33 | 76.57 |
| | Initial velocity difference (V30 – V0) | | −0.26 | −0.21 | −0.22 | −0.22 | −0.34 | −0.33 |
| | Initial velocity difference (V60 – V0) | | −0.48 | −0.39 | −0.38 | −0.4 | −0.72 | −0.71 |
| | Hysteresis loss of core (%) | | 49.5 | 49.4 | 49.1 | 48.8 | 50.6 | 51.8 |
| Ball properties | Deflection under load (nm) | Average | 2.50 | 2.75 | 2.72 | 2.91 | 2.25 | 2.90 |
| | Spin rate (rpm) | Driver (W#1) | 2,711 | 2,540 | 2,552 | 2,456 | 2,929 | 2,572 |
| | | Iron (I#6) | 6,231 | 5,566 | 5,552 | 5,391 | 6,885 | 5,901 |
| | Durability | | good | good | good | good | good | good |
| | Feel at impact | | good | good | good | good | NG | fair |

TABLE 4

| | | | Example | | | | Comparative Example | | |
|---|---|---|---|---|---|---|---|---|---|
| | | | 5 | 6 | 7 | 8 | 3 | 4 | 5 |
| Core properties | Diameter (mm) | Average | 36.95 | 36.97 | 35.50 | 39.00 | 36.97 | 35.50 | 39.01 |
| | Weight (g) | Average | 32.02 | 32.05 | 27.22 | 38.00 | 32.03 | 27.19 | 38.06 |
| | Deflection under load (mm) | Average: E | 3.20 | 3.99 | 3.60 | 3.66 | 3.50 | 3.63 | 3.62 |
| Hardness profile (JIS-C) | Center | | 62.8 | 55.5 | 59.3 | 59.9 | 59.4 | 59.2 | 60.0 |
| | H5.0 | | 65.5 | 60.4 | 63.6 | 64.0 | 62.7 | 63.0 | 63.8 |
| | H15.0 | | 79.4 | 75.2 | 75.0 | 76.8 | 70.3 | 69.9 | 71.1 |
| | Surface | | 88.0 | 82.9 | 84.7 | 85.3 | 80.1 | 80.8 | 78.4 |
| | Surface − Center | | 25.2 | 27.4 | 25.4 | 25.4 | 20.7 | 21.6 | 18.4 |
| | H15.0 − H5.0 | | 13.9 | 14.8 | 11.4 | 12.8 | 7.6 | 6.9 | 7.3 |
| Core moisture content (ppm) | Center | | 2,038 | 2,054 | 2,075 | 2,046 | 850 | 824 | 854 |
| | Surface | | 1,620 | 1,630 | 1,635 | 1,629 | 1,641 | 1,754 | 1,720 |
| | Surface − Center | | −418 | −424 | −440 | −417 | 791 | 930 | 866 |
| Crosslink density | ($\times 10^2$ mol/m$^3$) | Center | 9.8 | 8.7 | 9.2 | 9.1 | 11.4 | 11.0 | 10.9 |
| | | Intermediate | 10.4 | 9.3 | 10.1 | 9.9 | 12.5 | 12.3 | 12.4 |
| | | Outside | 25.2 | 21.0 | 23.1 | 22.9 | 18.2 | 17.5 | 17.5 |
| | | Outside − Center: P | 15.4 | 12.3 | 13.9 | 13.8 | 6.8 | 6.5 | 6.6 |
| | ($\times 10^2$ mol/m$^3 \cdot$ mm) | P × E | 49.3 | 49.1 | 50.0 | 50.5 | 23.8 | 23.6 | 23.9 |
| Tan δ at core center | 0.1% strain | | 0.042 | 0.038 | 0.042 | 0.039 | 0.052 | 0.051 | 0.050 |
| | 1% strain | | 0.043 | 0.041 | 0.043 | 0.040 | 0.054 | 0.054 | 0.053 |
| | 10% strain | | 0.057 | 0.055 | 0.057 | 0.055 | 0.098 | 0.096 | 0.097 |
| | Slope between 10% strain and 1% strain | | 0.0016 | 0.0016 | 0.0016 | 0.0017 | 0.0049 | 0.0047 | 0.0049 |
| Initial velocity after core standing (m/s) | 0 days of standing (V0) | | 77.77 | 77.18 | 77.30 | 77.33 | 77.39 | 77.30 | 77.36 |
| | 30 days of standing (V30) | | 77.36 | 77.01 | 77.09 | 77.12 | 77.02 | 77.08 | 77.10 |
| | 60 days of standing (V60) | | 77.12 | 76.84 | 76.99 | 76.87 | 76.48 | 76.62 | 76.60 |
| | Initial velocity difference (V30 − V0) | | −0.41 | −0.17 | −0.21 | −0.21 | −0.37 | −0.22 | −0.26 |
| | Initial velocity difference (V60 − V0) | | −0.65 | −0.34 | −0.31 | −0.46 | −0.91 | −0.68 | −0.76 |
| | Hysteresis loss of core (%) | | 48.8 | 49.6 | 49.3 | 48.2 | 51.0 | 52.0 | 51.4 |
| Ball properties | Deflection under load (nm) | Average | 2.30 | 3.34 | 3.27 | 3.22 | 2.90 | 3.30 | 3.25 |
| Spin rate (rpm) | Driver (W#1) | | 2,511 | 2,590 | 2,525 | 2,381 | 2,869 | 2,855 | 2,791 |
| | Iron (I#6) | | 5,252 | 5,488 | 5,347 | 5,105 | 5,858 | 5,800 | 5,777 |
| | Durability | | good | good | good | good | good | good | good |
| | Feel at impact | | good | good | good | good | fair | fair | fair |

It is apparent from the results in Tables 3 and 4 above that the golf balls in the Examples of the invention all had a reduced spin rate on shots with a driver, in addition to which the change over time in rebound, the durability and the feel at impact were all excellent.

By contrast, in Comparative Examples 1 to 5, the hardness differences between the surface and center of the core and between the positions H15.0 and H5.0 in the core were small, and so the hardness gradient was gradual. Moreover, the hysteresis loss (%) was greater than 50%. As a result, the ball was too receptive to spin and a spin rate-lowering effect could not be obtained on driver shots and shots with a middle iron. In addition, the feel at impact was poor.

The invention claimed is:

1. A golf ball comprising a core and a cover of one layer or a plurality of layers, wherein the core is formed of a material molded under heat from a rubber composition comprising the following components A to C:
   (A) a base rubber,
   (B) an organic peroxide, and
   (C) water,
   wherein the golf ball has a hardness at an interior thereof such that a value obtained by subtracting a JIS-C hardness $H_{5.0}$ at a position 5.0 mm outward from a center of the core and toward a periphery of the core from a JIS-C hardness $H_{15.0}$ at a position 15.0 mm outward from the core center and toward the core periphery is a positive value and not more than 18.3, wherein the amount of the water included per 100 parts by weight of the base rubber serving as component A is from 0.1 to 5 parts by weight.

2. The golf ball of claim 1, wherein the core has a JIS-C hardness difference obtained by subtracting a hardness at the center of the core from a hardness at a surface of the core which is at least 20.

3. The golf ball of claim 1, wherein the core has a diameter of not more than 42.0 mm and a deflection when compressed under a final load of 1,275 N (130 kgf) from an initial load state of 98 N (10 kgf) of from 2.0 to 6.0 mm.

4. The golf ball of claim 1, wherein the rubber composition before vulcanization has a moisture content of at least 1,000 ppm.

5. The golf ball of claim 1, wherein the rubber composition includes from 0.1 to 5 parts by weight of an organosulfur compound per 100 parts by weight of the base rubber.

6. The golf ball of claim 1, wherein the core after vulcanization has a higher moisture content at a center of the core than at a surface of the core.

7. The golf ball of claim 1, wherein a product P×E of a difference P (mol/m$^3$) in cros slink density between a surface of the core and a center of the core, as measured based on a toluene swelling test, multiplied by a deflection E (mm) of the core when compressed under a final load of 1,275 N (130 kgf) from an initial load state of 98 N (10 kgf) is at least 28×10$^2$ mol/m$^3$·mm.

8. The golf ball of claim 1 wherein, when a loss tangent of a center of the core is measured at a temperature of −12°

C. and a frequency of 15 Hz, letting $\tan \delta_1$ be a loss tangent at a dynamic strain of 1% and $\tan \delta_{10}$ be a loss tangent at a dynamic strain of 10%, the slope of these $\tan \delta$ values, expressed as $[(\tan \delta_{10} - \tan \delta_1)/(10\% - 1\%)]$, is not more than 0.003.

9. The golf ball of claim 1, wherein each layer of the cover has a thickness in a range of from 0.5 to 2.5 mm.

10. The golf ball of claim 1, wherein at least one layer of the cover is formed of a resin composition containing at least one of (I) and (II) below:
    (I) an ionic or nonionic olefin-unsaturated carboxylic acid copolymer,
    (II) an ionic or nonionic olefin-unsaturated carboxylic acid-carboxylic acid ester copolymer.

11. The golf ball of claim 10, wherein copolymers (I) and (II) have a base monomer that is ethylenic.

12. The golf ball of claim 10, wherein the carboxylic acid in ionic copolymers (I) and (II) is at least 30 mol % neutralized.

13. The golf ball of claim 1, wherein the core has a hysteresis loss of 50% or less when compressed at a load cell speed of 500 mm/min and under a constant load of 5,000 N.

14. The golf ball of claim 1, wherein a moisture content at the core center is from 1,000 to 7,000 ppm.

15. The golf ball of claim 1, wherein $\tan \delta_{10}$ is a loss tangent at a dynamic strain of 10%, and $\tan \delta_{10}$ is from 0.053 to 0.066.

16. The golf ball of claim 1, wherein a lower limit of the value obtained by subtracting the JIS-C hardness $H_{5.0}$ from the JIS-C hardness $H_{15.0}$ is 11.4.

17. A golf ball comprising a core and a cover of one layer or a plurality of layers, wherein the core is formed of a material molded under heat from a rubber composition comprising the following components A to C:
    (A) a base rubber,
    (B) an organic peroxide, and
    (C) water and/or a metal monocarboxylate,
    wherein the golf ball has a hardness at an interior thereof such that a value obtained by subtracting a JIS-C hardness $H_{5.0}$ at a position 5.0 mm outward from a center of the core and toward a periphery of the core from a JIS-C hardness $H_{15.0}$ at a position 15.0 mm outward from the core center and toward the core periphery is a positive value and not more than 18.3,
    wherein the core has a JIS-C hardness difference obtained by subtracting a hardness at the center of the core from a hardness at a surface of the core which is at least 20.

18. The golf ball of claim 17, wherein a lower limit of the value obtained by subtracting the JIS-C hardness $H_{5.0}$ from the JIS-C hardness $H_{15.0}$ is 11.4.

19. A golf ball comprising a core and a cover of one layer or a plurality of layers, wherein the core is formed of a material molded under heat from a rubber composition comprising the following components A to C:
    (A) a base rubber,
    (B) an organic peroxide, and
    (C) water and/or a metal monocarboxylate,
    wherein the golf ball has a hardness at an interior thereof such that a value obtained by subtracting a JIS-C hardness $H_{5.0}$ at a position 5.0 mm outward from a center of the core and toward a periphery of the core from a JIS-C hardness $H_{15.0}$ at a position 15.0 mm outward from the core center and toward the core periphery is a positive value and not more than 18.3,
    wherein a moisture content at the core center is from 1,000 to 7,000 ppm.

20. The golf ball of claim 19, wherein a lower limit of the value obtained by subtracting the JIS-C hardness $H_{5.0}$ from the JIS-C hardness $H_{15.0}$ is 11.4.

* * * * *